(12) United States Patent
Matsushita (10) Patent No.: US 11,695,446 B2
(45) Date of Patent: Jul. 4, 2023

(54) COMMUNICATION APPARATUS (71) Applicant: TOSHIBA TEC KABUSHIKI KAISHA, Tokyo (JP)

(72) Inventor: Naohiro Matsushita, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/673,271

(22) Filed: Feb. 16, 2022

(65) Prior Publication Data
US 2022/0416839 A1    Dec. 29, 2022

(30) Foreign Application Priority Data

Jun. 24, 2021   (JP) .................................. 2021-105061

(51) Int. Cl.
*H04B 1/58* (2006.01)
*H04B 1/10* (2006.01)
*H04B 1/00* (2006.01)

(52) U.S. Cl.
CPC .......... *H04B 1/588* (2013.01); *H04B 1/0057* (2013.01); *H04B 1/1018* (2013.01); *H04B 2001/1045* (2013.01)

(58) Field of Classification Search
CPC .... H04B 1/588; H04B 1/0057; H04B 1/1018; H04B 2001/1045; H04B 1/109; H04B 1/123; H04B 1/126; H04B 1/525
See application file for complete search history.

(56) References Cited

U.S. PATENT DOCUMENTS

| | | | | |
|---|---|---|---|---|
| 5,574,978 A * | 11/1996 | Talwar | ................... | H04B 1/525 455/296 |
| 6,229,992 B1 * | 5/2001 | McGeehan | ............ | H04B 1/408 455/24 |
| 8,780,963 B1 * | 7/2014 | Haddadin | .............. | H04B 1/525 455/67.13 |
| 8,879,663 B1 * | 11/2014 | Haddadin | ................. | H03F 1/32 708/200 |
| 9,525,453 B2 * | 12/2016 | Sarrigeorgidis | ......... | H04B 1/12 |
| 9,847,865 B2 * | 12/2017 | Moher | .................... | H04B 1/525 |
| 10,230,419 B2 * | 3/2019 | Bharadia | ................ | H04B 1/525 |
| 10,348,343 B1 * | 7/2019 | Gupta | ...................... | H04B 1/10 |
| 11,329,689 B1 * | 5/2022 | Rodenbeck | .............. | H04B 1/30 |
| 2008/0079547 A1 * | 4/2008 | Alicot | .................... | H04B 1/525 340/10.3 |
| 2008/0219377 A1 * | 9/2008 | Nisbet | .................... | H04B 1/406 455/501 |

(Continued)

FOREIGN PATENT DOCUMENTS

JP    2010-008313 A    1/2010

*Primary Examiner* — Jinsong Hu
*Assistant Examiner* — Rui M Hu
(74) *Attorney, Agent, or Firm* — Kim & Stewart LLP (57) ABSTRACT

According to an embodiment, a communication apparatus creates a prediction model taking into consideration of the actual fluctuation of a self-interference signal. The communication apparatus selects, where the self-interference signal has largely fluctuated, a prediction model in accordance with a fluctuation pattern at an early stage of the fluctuation. The communication apparatus generates a cancel signal by control applying a gain and an amount of phase shift represented by the prediction model.

10 Claims, 7 Drawing Sheets

(56) References Cited

U.S. PATENT DOCUMENTS

| | | | |
|---|---|---|---|
| 2010/0135439 A1* | 6/2010 | Lackey | H04B 1/525 375/344 |
| 2010/0197231 A1* | 8/2010 | Kenington | H04B 1/525 455/63.1 |
| 2011/0195672 A1* | 8/2011 | Pratt | H04B 1/525 455/295 |
| 2011/0195673 A1* | 8/2011 | Pratt | H04B 1/52 455/78 |
| 2012/0094617 A1* | 4/2012 | Tone | H04B 1/525 455/78 |
| 2012/0295558 A1* | 11/2012 | Wang | H04B 1/123 455/79 |
| 2014/0194073 A1* | 7/2014 | Wyville | H04B 1/62 455/73 |
| 2014/0269970 A1* | 9/2014 | Pratt | H04L 5/1461 375/285 |
| 2014/0334349 A1* | 11/2014 | Mao | H04B 1/0475 370/278 |
| 2014/0348018 A1* | 11/2014 | Bharadia | H04B 1/56 370/278 |
| 2015/0156003 A1* | 6/2015 | Khandani | H04L 5/143 370/278 |
| 2015/0171902 A1* | 6/2015 | Fleischer | H04B 17/19 375/285 |
| 2015/0311929 A1* | 10/2015 | Carbone | H04B 15/00 455/78 |
| 2015/0311931 A1* | 10/2015 | Rozental | H04B 1/709 375/343 |
| 2015/0341125 A1* | 11/2015 | Bharadia | H04B 15/00 370/277 |
| 2016/0344238 A1 | 11/2016 | Yeh et al. | |
| 2016/0352411 A1* | 12/2016 | Lange | H04W 88/085 |
| 2017/0353286 A1* | 12/2017 | Nallampattiekambaram | H04B 1/525 |
| 2021/0258816 A1* | 8/2021 | Cai | H04B 17/336 |
| 2022/0263643 A1* | 8/2022 | Sugimoto | H04L 5/1461 |
| 2023/0003832 A1* | 1/2023 | Watkins | G01S 13/95 |

* cited by examiner

COMMUNICATION APPARATUS

CROSS-REFERENCE TO RELATED APPLICATIONS

This application is based upon and claims the benefit of priority from the prior Japanese Patent Application No. 2021-105061, filed on Jun. 24, 2021, the entire contents of which are incorporated herein by reference.

FIELD

An embodiment to be described here generally relates to a communication apparatus.

BACKGROUND

In a communication apparatus that uses an antenna for both transmission and reception, part of a transmission signal is superimposed on a reception signal and flows into a reception system. A transmission signal component superimposed on this reception signal is a self-interference signal and there is a possibility that communication quality deteriorates due to saturation of a reception system and an increase in noise. In this regard, there is known a technology in which a cancel signal having a phase opposite to that of a self-interference signal is generated from a transmission signal and this cancel signal is used to cancel the self-interference signal.

However, in the past, setting of a gain and an amount of phase shift for generating an appropriate cancel signal has been performed by sweeping the amount of phase shift and the gain, and the time necessary for the setting has been long. Under such circumstances, it has been desired to shorten the time necessary for setting for generating a cancel signal.

DETAILED DESCRIPTION

According to an embodiment, a communication apparatus includes: a first generation device; a duplexer; a second generation device; a synthesis device; a detection device; a first control device; a third generation device; a selection device; and a second control device. The first generation device generates a transmission signal for wireless transmission. The duplexer includes an input terminal for inputting the transmission signal generated by the first generation device, an input/output terminal for outputting the transmission signal input by the input terminal and inputting a reception signal, and an output terminal for outputting the reception signal input by the input/output terminal. The second generation device generates a cancel signal by changing an amplitude and a phase of the transmission signal generated by the first generation device. The synthesis device synthesizes the reception signal output from the output terminal with the cancel signal. The detection device detects an error level of the cancel signal with respect to a self-interference signal included in the reception signal output from the output terminal. The first control device controls the second generation device to generate the cancel signal with a gain and an amount of phase shift determined in accordance with the error level detected by the detection device. The third generation device records, a plurality of times, a fluctuation pattern of the error level detected by the detection device in a predetermined first period after the error level detected by the detection device starts to fluctuate, and generates, on a basis of a gain and an amount of phase shift determined by the first control device after the plurality of times of fluctuations of the error level converge and the plurality of recorded fluctuation patterns, a plurality of prediction models that associate a fluctuation pattern of the error level predicted in a second period that is early part of the first period and the gain and the amount of phase shift after the converge of fluctuations with each other. The selection device selects, on a basis of a fluctuation pattern detected by the detection device in the second period after the error level detected by the detection device starts to fluctuate, one of the plurality of prediction models generated by the third generation device. The second control device controls the second generation device to generate the cancel signal with a gain and an amount of phase shift represented by the prediction model selected by the selection device.

An embodiment will be described with reference to the drawings. In the drawings, the same reference symbols will denote the same or similar portions. Note that in the following, a reading apparatus that reads data stored in an RFID (radio frequency identification) tag will be described as an example. This reading apparatus performs wireless communication with the RFID tag when reading the data described above. This reading apparatus is an example of the communication apparatus.

Figure 1:
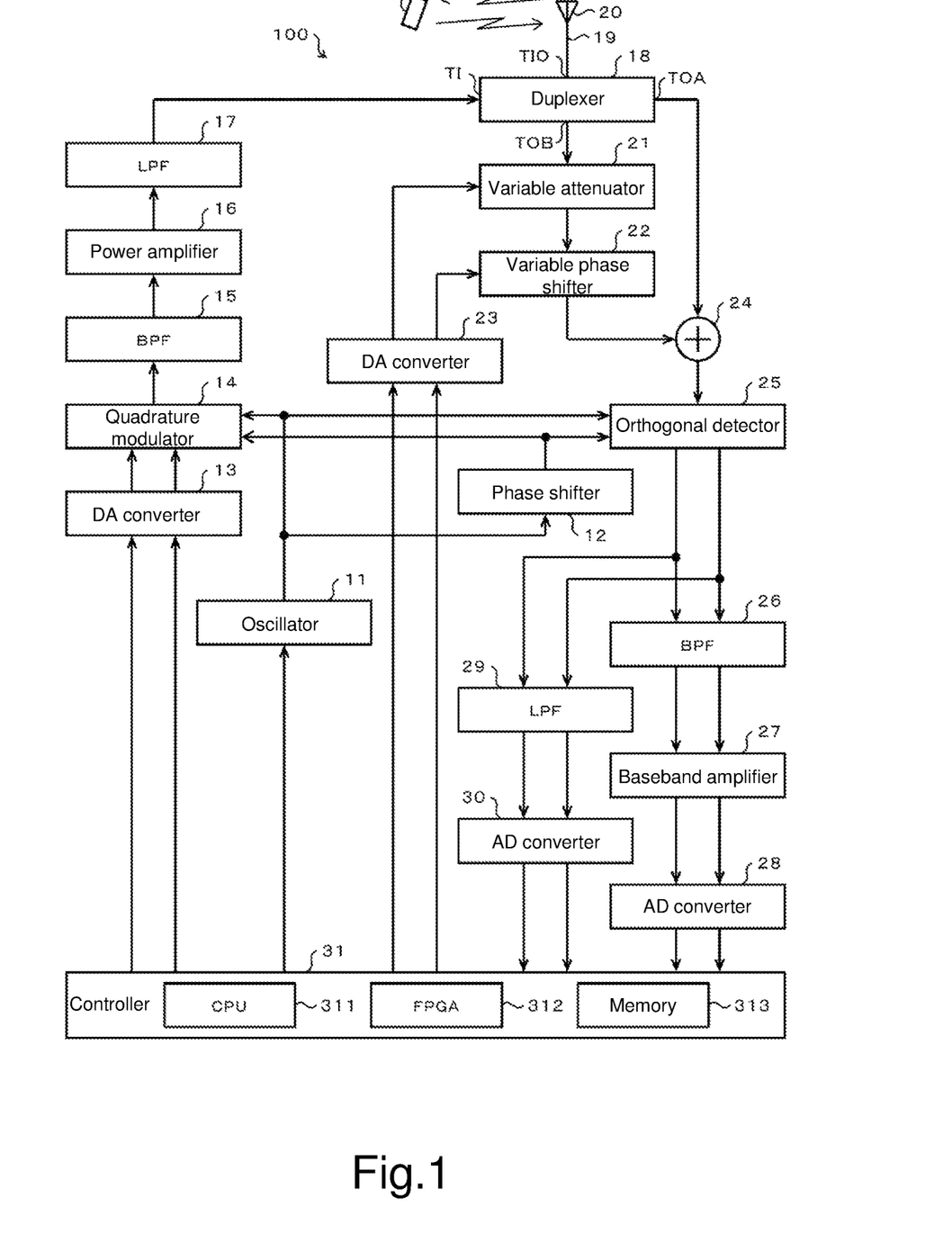
FIG. 1 is a block diagram showing a main circuit configuration of a reading apparatus according to an embodiment.

FIG. 1 is a block diagram showing a main circuit configuration of a reading apparatus 100 according to this embodiment. The reading apparatus 100 includes an oscillator 11, a phase shifter 12, a DA (digital to analog) converter 13, a quadrature modulator 14, a BPF (band-pass filter) 15, a power amplifier 16, an LPF (low-pass filter) 17, a duplexer 18, a feed line 19, an antenna 20, a variable attenuator 21, a variable phase shifter 22, a DA (digital to analog) convertor 23, a power synthesizer 24, an orthogonal detector 25, a BPF 26, a baseband amplifier 27, an AD (analog to digital) convertor 28, an LPF 29, an AD convertor 30, and a controller 31. The controller 31 includes a processor 311, an FPGA (field programmable gate array) 312, and a memory 313. The processor 311 is, for example, a CPU and will be referred to as the CPU 311 below. Note that the antenna 20, or the feed line 19 and the antenna 20 are not necessarily included in the reading apparatus 100, and an arbitrary separate device may be connectable.

The oscillator 11 generates a sine wave having a predetermined frequency as a carrier wave. The phase shifter shifts the phase of the carrier wave generated by the oscillator 11 by 90 degrees to output a cosine wave as another carrier wave.

The DA converter 13 converts two-system transmission baseband signals output in a digital state from the CPU 311 into analog signals. Note that in the following, the two-system transmission baseband signals will be referred to as the I signal and the Q signal.

The quadrature modulator 14 inputs, as a modulation wave, the I signal and the Q signal that have been converted into analog signals by the DA converter 13. The quadrature modulator 14 inputs, as carrier waves of the I-system and Q-system, the carrier wave generated by the oscillator 11 and the carrier wave output from the phase shifter 12, respectively. The quadrature modulator 14 acquires a transmission signal by quadrature modulation.

The BPF (band-pass filter) 15 removes low-frequency components and high-frequency components for band limitation from the transmission signal acquired by the quadrature modulator 14. The power amplifier 16 power-amplifies the transmission signal that has passed through the BPF 15 to a level suitable for wireless transmission. The LPF (low-pass filter) 17 removes harmonic components from the transmission signal amplified by the power amplifier 16. By each process by the BPF 15, the power amplifier 16, and the LPF 17, the transmission signal turns into a signal for wireless transmission. That is, the BPF 15, the power amplifier 16, and the LPF 17 configure a first generation device that generates a transmission signal for wireless transmission.

The duplexer 18 includes an input terminal TI, an input/output terminal TIO, an output terminal TOA, and an output terminal TOB. The transmission signal that has passed through the LPF 17 is input to the input terminal TI. The duplexer 18 outputs, from the input/output terminal TIO and the output terminal TOB, the transmission signal input to the input terminal TI. The duplexer 18 outputs, from the output terminal TOA, the signal input to the input/output terminal TIO. The signal output from the output terminal TOA of the duplexer 18 is a signal obtained by combining the reception signal generated in the antenna 20 and a self-interference signal described below, and this signal will be referred to simply as the reception signal below. The duplexer 18 is an example of a duplexer. The duplexer 18 includes a directional coupler for example.

The feed line 19 supplies, to the antenna 20, the transmission output from the input/output terminal TIO of the duplexer 18. The feed line 19 transmits the reception signal generated in the antenna 20 to the input/output terminal TIO of the duplexer 18. The antenna 20 radiates radio waves corresponding to the transmission signal supplied by the feed line 19. The antenna 20 generates, as a reception signal, an electrical signal corresponding to the incoming radio waves.

The variable attenuator 21 attenuates the transmission signal output from the output terminal TOB of the duplexer 18 with the gain corresponding to a gain setting signal supplied from the DA converter 23. The variable phase shifter 22 changes the phase of the transmission signal attenuated by the variable attenuator 21 with the amount of phase shift corresponding to an amount-of-phase-shift setting signal supplied from the DA converter 23. The transmission signal phase-shifted by the variable phase shifter 22 will be referred to as the cancel signal below. In this way, the variable attenuator 21 and the variable phase shifter 22 realize a function as a second generation device that generates a cancel signal.

The DA converter 23 converts gain setting data output from the controller 31 into a gain setting signal in an analog state, and then supplies the obtained signal to the variable attenuator 21. The DA converter converts amount-of-phase-shift setting data output from the controller 31 into an amount-of-phase-shift setting signal in an analog state, and then supplies the obtained signal to the variable phase shifter 22.

The power synthesizer 24 power-synthesizes the reception signal output from the output terminal TOA of the duplexer 18 with the cancel signal output from the variable phase shifter 22. In this way, the power synthesizer 24 reduces the self-interference signal included in the reception signal. The power synthesizer 24 is an example of a synthesis device.

The orthogonal detector 25 orthogonally detects the reception signal output from the power synthesizer 24 using the two carrier waves output from the oscillator 11 and the phase shifter 12. The orthogonal detector 25 outputs, in parallel, two-system reception baseband signals in an analog state obtained by the orthogonal detection. That is, the orthogonal detector 25 is an example of a detection device.

The BPF 26 extracts components in the required frequency band from each of the two-system reception baseband signals output from the orthogonal detector 25. The baseband amplifier 27 amplifies each of the two-system reception baseband signals that have transmitted through the BPF 26 to a level suitable for digitization by the AD convertor 28. The AD convertor 28 digitizes each of the two-system reception baseband signals amplified by the baseband amplifier 27.

The LPF 29 removes harmonic components included in each of the two-system reception baseband signals output from the orthogonal detector 25. The AD convertor 30 digitizes each of the two-system reception baseband signals output from the LPF 29.

The CPU 311 outputs, when communicating with a RFID tag 200, the I signal and the Q signal in accordance with a predetermined sequence. The CPU 311 reconstructs, on the basis of the two-system reception baseband signals digitized by the AD convertor 28, the data transmitted from the RFID tag 200. The CPU 311 executes, on the basis of the two-system reception baseband signals digitized by the AD convertor 30, information processing for adjusting the gain in the variable attenuator 21 and the amount of phase shift in the variable phase shifter 22, which will be described below.

The FPGA 312 performs pre-programmed signal processing to execute various operations associated with the information processing by the CPU 311 at a high speed. One of the functions of the FPGA 312 is processing of calculating, on the basis of the level of each of the two-system reception baseband signals digitized by the AD convertor 30, the error level of the cancel signal with respect to the self-interference signal. In this way, the FPGA 312 functions as a detection device that detects an error level by the operation based on the level of each of the two-system reception baseband signals.

The memory 313 stores an information processing program that describes the information processing executed by the CPU 311. The memory 313 stores various types of data necessary for the CPU 311 to execute various types of information processing. The memory 313 stores various types of data generated or acquired when the CPU 311 executes various types of information processing.

Next, the operation of the reading apparatus 100 configured as described above will be described. Note that the operation for reading the RFID tag 200 may be, for example, another known operation using a quadrature modulation method as a modulation method for wireless communication. For this reason, description of the operation thereof will be omitted and the operation for adjusting the gain in the variable attenuator 21 and the amount of phase shift in the variable phase shifter 22 will be described.

Prior to the description of the operation, the self-interference signal will be described. The duplexer 18 is designed such that the transmission signal input to the input terminal TI is not output from the output terminal TOA. However, in the actual circuit configuration, it is difficult to completely prevent the transmission signal input to the input terminal TI from leaking from the output terminal TOA. For this reason, part of the transmission signal input to the input terminal TI is output from the output terminal TOA as it is. Further, part of the transmission signal output from the input/output terminal TIO of the duplexer 18 is reflected at the feeding point of the antenna 20 and transmitted to the duplexer 18 by the feed line 19. Such a reflection signal is output from the output terminal TOA by the function of the duplexer 18. In this way, the signal output from the output terminal TOA of the duplexer 18 includes components of the transmission signal that has leaked without being output from the input/output terminal TIO and components of the transmission signal input as a reflection signal to the input/output terminal TIO. Such a signal in which the components of the transmission signal are synthesized is a self-interference signal. Note that the property of the reflection of the transmission signal at the feeding point of the antenna 20 changes depending on the environment around the antenna 20, such as the proximity of the RFID tag 200 and another object to the antenna 20. For this reason, also the amplitude and the phase of the signal reflected at the feeding point of the antenna 20 change depending on the environment around the antenna 20. Due to this effect, also the amplitude and the phase of the self-interference signal change depending on the environment around the antenna 20.

Note that the self-interference signal is a signal derived from a transmission signal. For this reason, by changing the amplitude and the phase of the signal branched from the transmission signal, it is possible to generate a signal having the same frequency and amplitude as those of the self-interference signal and a phase opposite to that of the self-interference signal. Then, by synthesizing the reception signal output from the output terminal TOA of the duplexer 18 with such a signal, it is possible to cancel the self-interference signal included in the reception signal. In the reading apparatus 100, by synthesizing, by the power synthesizer 24, the reception signal output from the output terminal TOA of the duplexer 18 with the cancel signal obtained by changing the amplitude and the phase in the variable attenuator 21 and the variable phase shifter 22, the self-interference signal included in the reception signal is reduced.

Incidentally, the reading apparatus 100 is used for, for example, reading data from the RFID tag 200 attached to an article placed at a predetermined position in a warehouse. For this reason, there is a possibility that the tendency of changes in the self-interference signal in the case where the work in which a worker holding the reading apparatus 100 moves to the front of a certain shelf and causes the reading apparatus 100 to read the RFID tag 200 attached to an article placed on the shelf is repeated is similar.

In this regard, the administrator, maintenance personnel, or the like of the reading apparatus 100 performs, as the initial setting work for starting to use the reading apparatus 100 or the maintenance work corresponding to a change in shelf allocation, the work of causing the reading apparatus 100 to learn the tendency described above. At this time, the administrator, maintenance personnel, or the like repeats an operation imitating the actual reading work using the reading apparatus 100 caused to operate in a learning mode.

Figure 2:
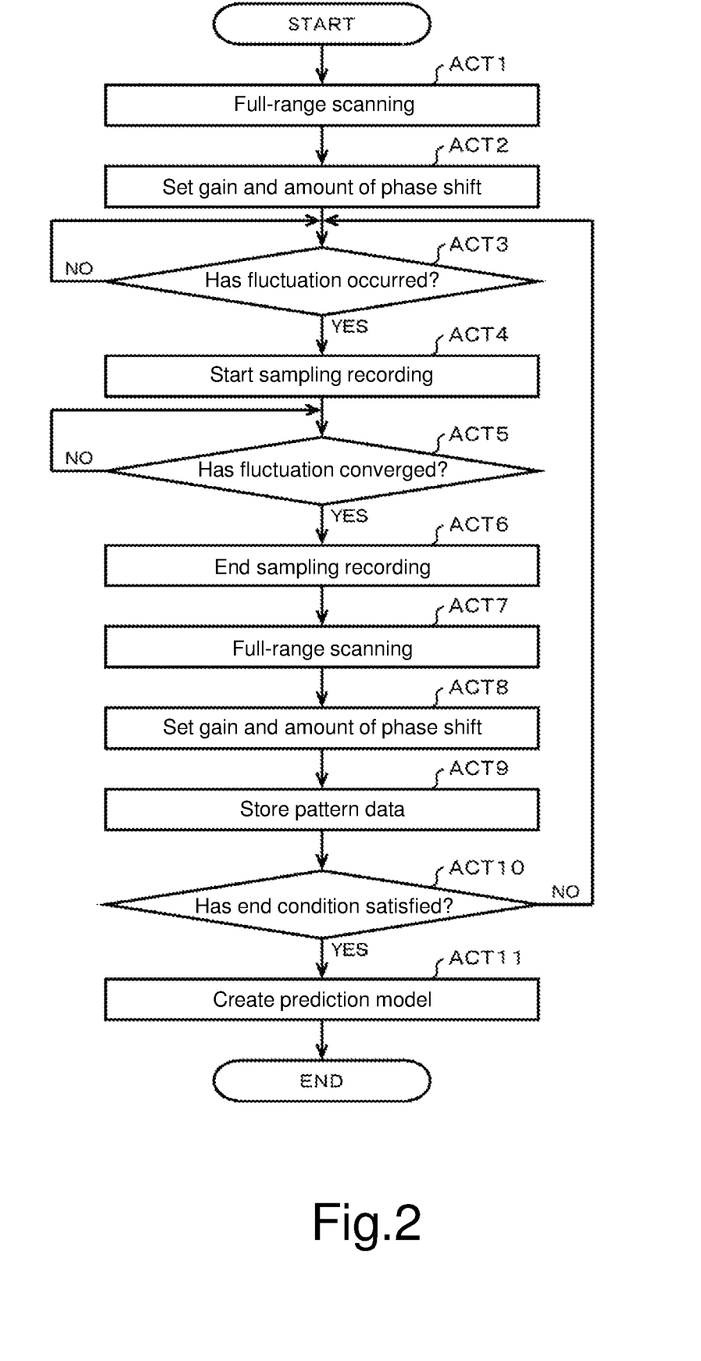
FIG. 2 is a flowchart showing learning processing of the reading apparatus according to the embodiment.

Incidentally, when the reading apparatus 100 is set to the learning mode, the CPU 311 executes learning processing as information processing according to the information processing program stored in the memory 313. FIG. 2 is a flowchart showing the learning processing.

In ACT1, the CPU 311 executes full-range scanning. For example, the CPU 311 checks the error level while gradually changing the gain and the amount of phase shift within the full ranges of the adjustable range of the gain in the variable attenuator 21 and the adjustable range of the amount of phase shift in the variable phase shifter 22. The CPU 311 finds a combination of the gain and the amount of phase shift with which the error level is the smallest.

The error level described above is an index value of the magnitude of the error between the cancel signal and the self-interference signal. The error level is obtained by performing, by the FPGA 312, predetermined arithmetic processing on the two-system reception baseband signals in a digital state output from the AD convertor 30. As an example, the FPGA 312 calculates the error level as SQR $(LI^2+LQ^2)$, LI and LQ representing the signal revels of the two-system reception baseband signals in a digital state. Note that the "SQR" represents a square root. However, the error level may be calculated by performing information processing by the CPU 311.

In ACT2, the CPU 311 sets the found gain and amount of phase shift (see ACT1) in the variable attenuator 21 and the variable phase shifter 22. For example, the CPU 311 outputs, to the DA converter 23, the gain setting data and the amount-of-phase-shift setting data corresponding to the found gain and amount of phase shift. Then, the DA converter 23 converts the gain setting data and the amount-of-phase-shift setting data into pieces of analog data. As a result, a gain setting signal and an amount-of-phase-shift setting signal are obtained. Then, the gain setting signal and the amount-of-phase-shift setting signal are supplied to the variable attenuator 21 and the variable phase shifter 22. Then, in response thereto, a state in which the variable attenuator 21 and the variable phase shifter 22 generate a cancel signal by performing attenuation and phase shift with the gain and the amount of phase shift found in ACT1 is achieved.

Figure 3:
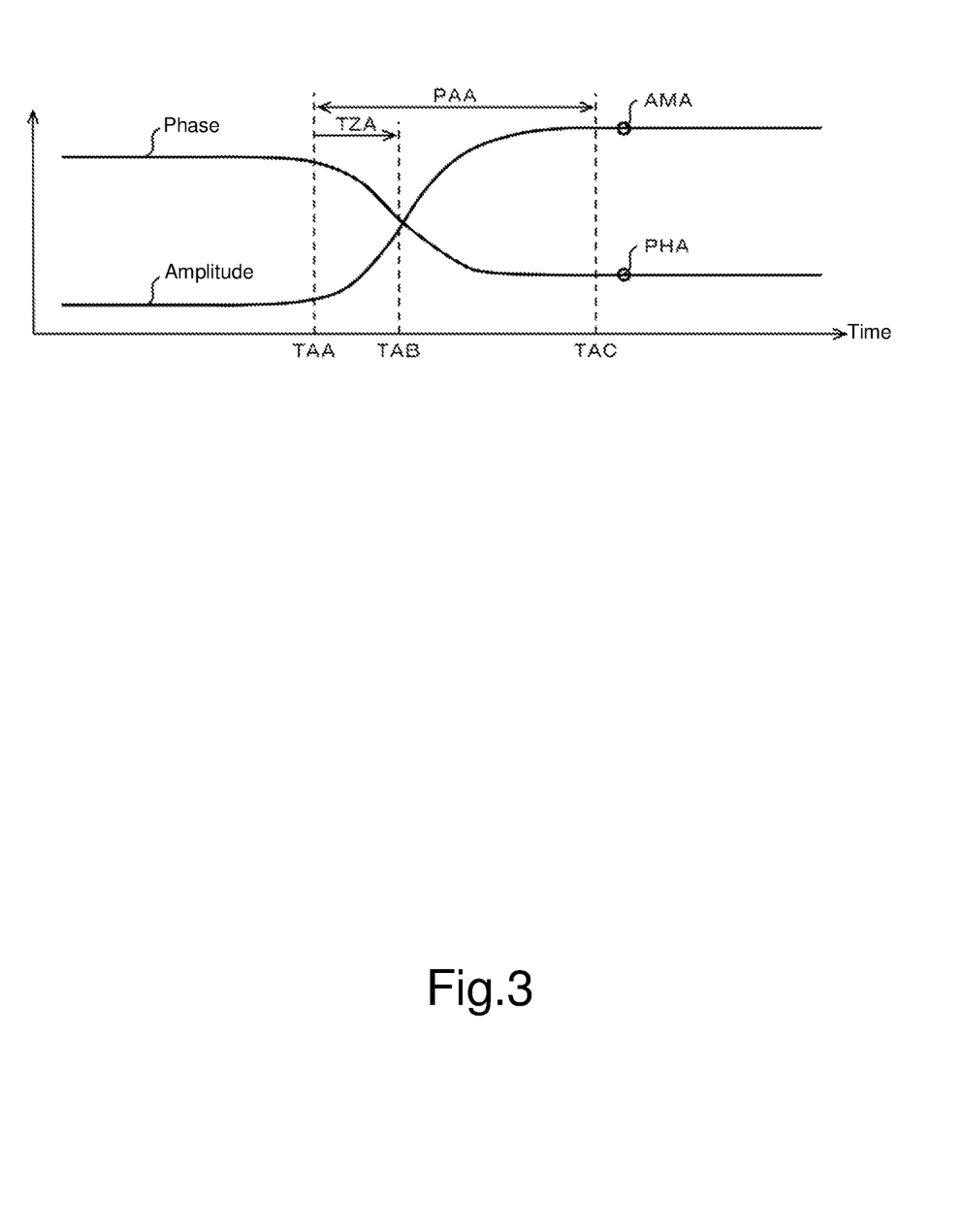
FIG. 3 is a diagram showing an example of fluctuations of an amplitude and a phase of a self-interference signal in the reading apparatus according to the embodiment.
Figure 4:
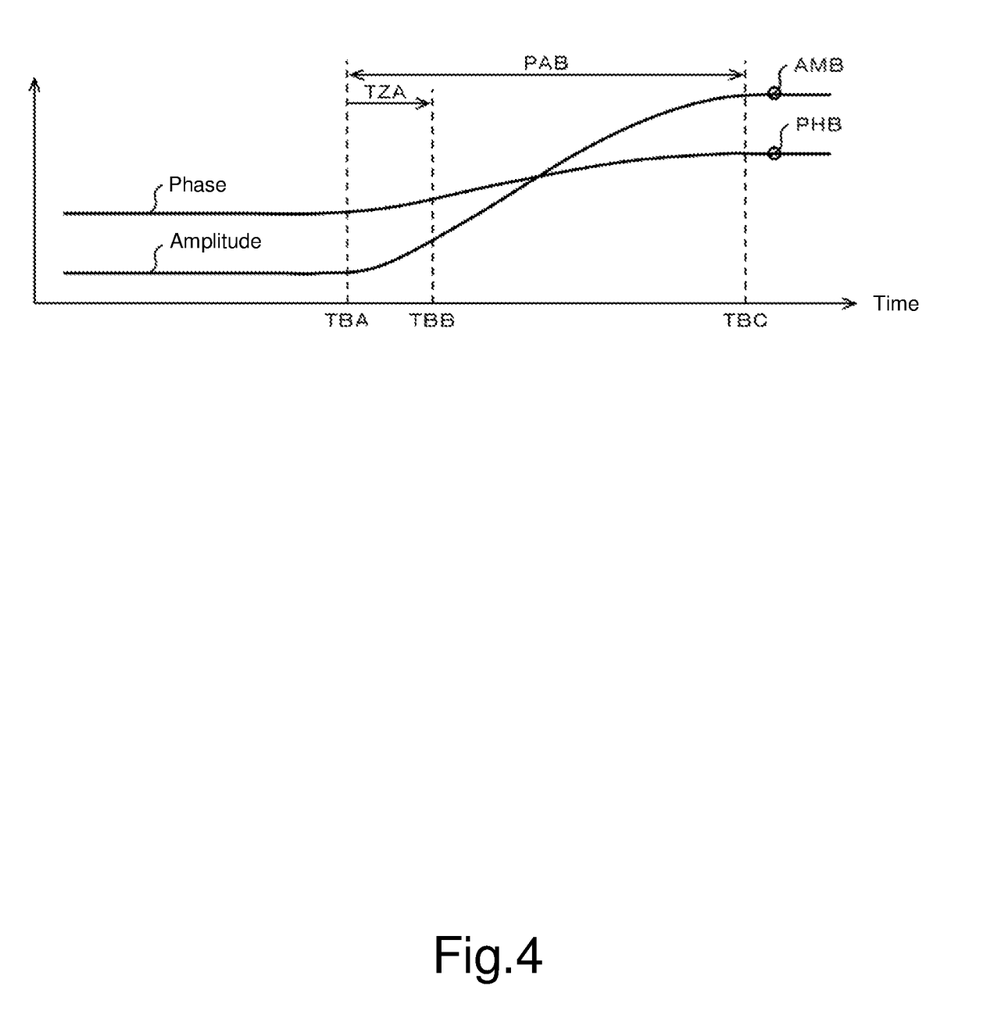
FIG. 4 is a diagram showing an example of fluctuations of the amplitude and the phase of the self-interference signal in the reading apparatus according to the embodiment.
Figure 5:
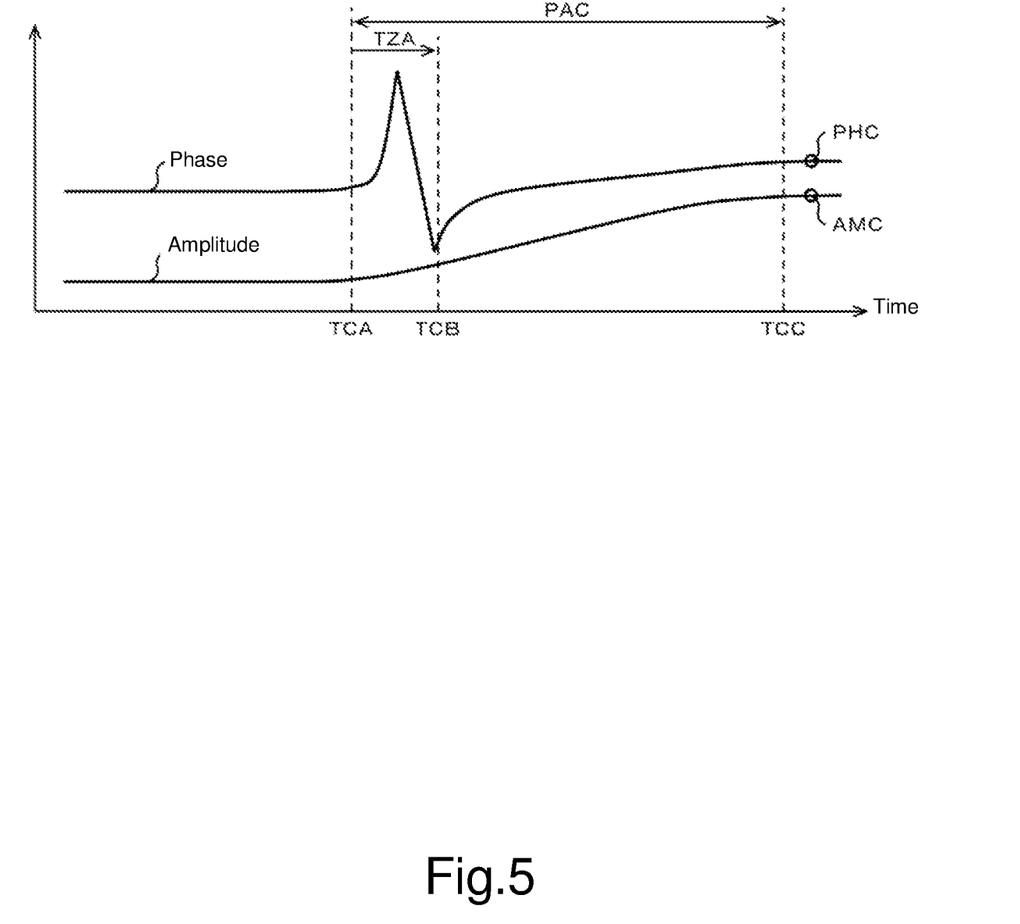
FIG. 5 is a diagram showing an example of fluctuations of the amplitude and the phase of the self-interference signal in the reading apparatus according to the embodiment.

FIGS. 3 to 5 are each a diagram showing an example of fluctuations of an amplitude and a phase of a self-interference signal. As shown in FIG. 3 to FIG. 5, the amplitude and the phase of the self-interference signal fluctuate due to environmental changes associated with movement of the reading apparatus 100, or the like. Since the CPU 311 does not change the gain and the amount of phase shift of the variable attenuator 21 and the variable phase shifter 22 in this example, the error level fluctuates in accordance with the fluctuation of the amplitude and the phase of the self-interference signal.

In ACT3, the CPU 311 stands by until the self-interference signal fluctuates. Then, for example, the CPU 311 determined, in the case where the error level has reached a predetermined first threshold value or more, that the self-interference signal has fluctuated. In the case where it is determined that the self-interference signal has fluctuated (YES in ACT3), the processing of the CPU 311 proceeds to ACT4. For example, the CPU 311 determines that the fluctuation has occurred at a time point TAA in FIG. 3, a time point TBA in FIG. 4, or a time point TCA in FIG. 5. Note that the first threshold value may be arbitrarily set by a designer of the reading apparatus 100, a creator of the information processing program, or the like.

In ACT4, the CPU 311 starts sampling recording an error level. For example, the CPU 311 acquires an error level from the FPGA 312 at predetermined time intervals and stores the error level so that the acquisition order thereof can be checked.

In ACT5, the CPU 311 checks whether or not the fluctuation of the self-interference signal has converged. For example, the CPU 311 determines, in the case where the amount of change in the error level per unit time is smaller than a predetermined second threshold value, that the fluctuation has converged. In the case where it is determined that the fluctuation has converged (YES in ACT5), the processing of the CPU 311 proceeds to ACT6. For example, the CPU 311 determines that the fluctuation has converged at a time point TAC in FIG. 3, a time point TBC in FIG. 4, or a time point TCC in FIG. 5. Note that the second threshold value may be arbitrarily set by a designer of the reading apparatus 100, a creator of the information processing program, or the like.

In ACT6, the CPU 311 ends the sampling recording. As a result, the CPU 311 performs sampling recording a period PAA in FIG. 3, a period PAB in FIG. 4, or a period PAC in FIG. 5, for example. That is, the length of the period in which sampling recording is performed changes depending on the fluctuation form of the self-interference signal. In this way, the periods PAA, PAB, and PAC in which sampling recording is performed are determined in advance as the period in which fluctuation substantially occurs. The periods PAA, PAB, and PAC each correspond to a first period.

In ACT7, the CPU 311 executes full-range scanning. The specific processing of the CPU 311 in this example may be similar to the processing illustrated for ACT1, for example. In ACT8, the CPU 311 sets the gain and the amount of phase shift found in ACT7 in the variable attenuator 21 and the variable phase shifter 22. The specific processing of the CPU 311 in this example may be similar to the processing illustrated for ACT2, for example. Then, as a result, the CPU 311 sets the gain determined on the basis of an amplitude AMA in the variable attenuator 21 and sets the amount of phase shift determined on the basis of a phase PHA in the variable phase shifter 22 in the case of FIG. 3, for example. Further, for example, in the case of FIG. 4, the CPU 311 sets the gain determined on the basis of an amplitude AMB in the variable attenuator 21 and the amount of phase shift determined on the basis of a phase PHB in the variable phase shifter 22. Further, for example, in the case of FIG. 5, the CPU 311 sets the gain determined on the basis of an amplitude AMC in the variable attenuator 21 and sets the amount of phase shift determined on the basis of a phase PHC in the variable phase shifter 22.

In ACT9, the CPU 311 stores pattern data in the memory 313. For example, the CPU 311 generates pattern data as data representing the gain and the amount of phase shift found in ACT7 in association with a set of error levels sampling-recorded in ACT4 to ACT6, and stores the generated pattern data in the memory 313.

In ACT10, the CPU 311 determines whether or not the learning end condition has been satisfied. Then, in the case where it is determined that the learning end condition has not been satisfied (determined as NO in ACT10), the processing of the CPU 311 returns to the stand-by state in ACT3. In this way, the CPU 311 repeats the processing in ACT3 to ACT9 to accumulate a plurality of pieces of pattern data in the memory 313.

The end condition is determined as, for example, the case where the number of pieces of pattern data accumulated as described above reaches a predetermined number. However, the end condition may be determined as, for example, the number of pieces of pattern data exceeds a predetermined number and the end of learning is instructed by an administrator, a maintenance personnel, or the like, and may be arbitrarily set by a designer of the reading apparatus 100, a creator of the information processing program, or the like. Then, in the case where the learning end condition has been satisfied (determined as YES in ACT10), the processing of the CPU 311 proceeds to ACT11.

In ACT11, the CPU 311 creates a plurality of prediction models on the basis of the pieces of pattern data accumulated as described above. The prediction model is, for example, data representing a model of a fluctuation pattern of error levels in an early certain period of a self-interference signal in association with the gain and the amount of phase shift. As the specific information processing for creating a prediction model, a well-known process such as a regression method and a k-nearest neighbor method can be used. The CPU 311 stores the created prediction model in the memory 313. In the case where the prediction model created in the learning processing executed in the past has been stored in the memory 313, the CPU 311 may overwrite the prediction model with a newly created prediction model or additionally store the new prediction model. Then, the CPU 311 ends the learning processing when finishing creating the prediction model.

For example, on the basis of the plurality of pieces of pattern data having similar fluctuation patterns of error levels in the period PAA in FIG. 3, a prediction model in which a fluctuation pattern model representing the tendency of fluctuation patterns of error levels from the time point TAA to a time point TAB a period TZA after the time point TAA is associated with a typical gain and amount of phase shift based on the setting tendency of the gain and the amount of phase shift is created. On the basis of the plurality of pieces of pattern data having similar fluctuation patterns of error levels in the period PAB in FIG. 4, a prediction model in which a fluctuation pattern model representing the tendency of fluctuation patterns of error levels from the time point TBA to a time point TBB a period TZA after the time point TBA is associated with a typical gain and amount of phase shift based on the setting tendency of the gain and the amount of phase shift is created. On the basis of the plurality of pieces of pattern data having similar fluctuation patterns of error levels in the period PAC in FIG. 5, a prediction model in which a fluctuation pattern model representing the tendency of fluctuation patterns of error levels from the time point TCA to a time point TCB a period TZA after the time point TCA is associated with a typical gain and amount of phase shift based on the setting tendency of the gain and the amount of phase shift is created. That is, the fluctuation pattern model represented in each of the plurality of prediction models is related to the same period corresponding to the period TZA. In this way, the period in which a fluctuation pattern model is predicted is determined in advance as a period corresponding to the period TZA starting from the detection of the fluctuation of the error level and corresponds to a second period. Note that the period TZA may be arbitrarily determined by a designer of the reading apparatus 100, a creator of the information processing program, or the like. In this way, the CPU 311 functions as a third generation device by executing learning processing based on an information processing program.

Figure 6:
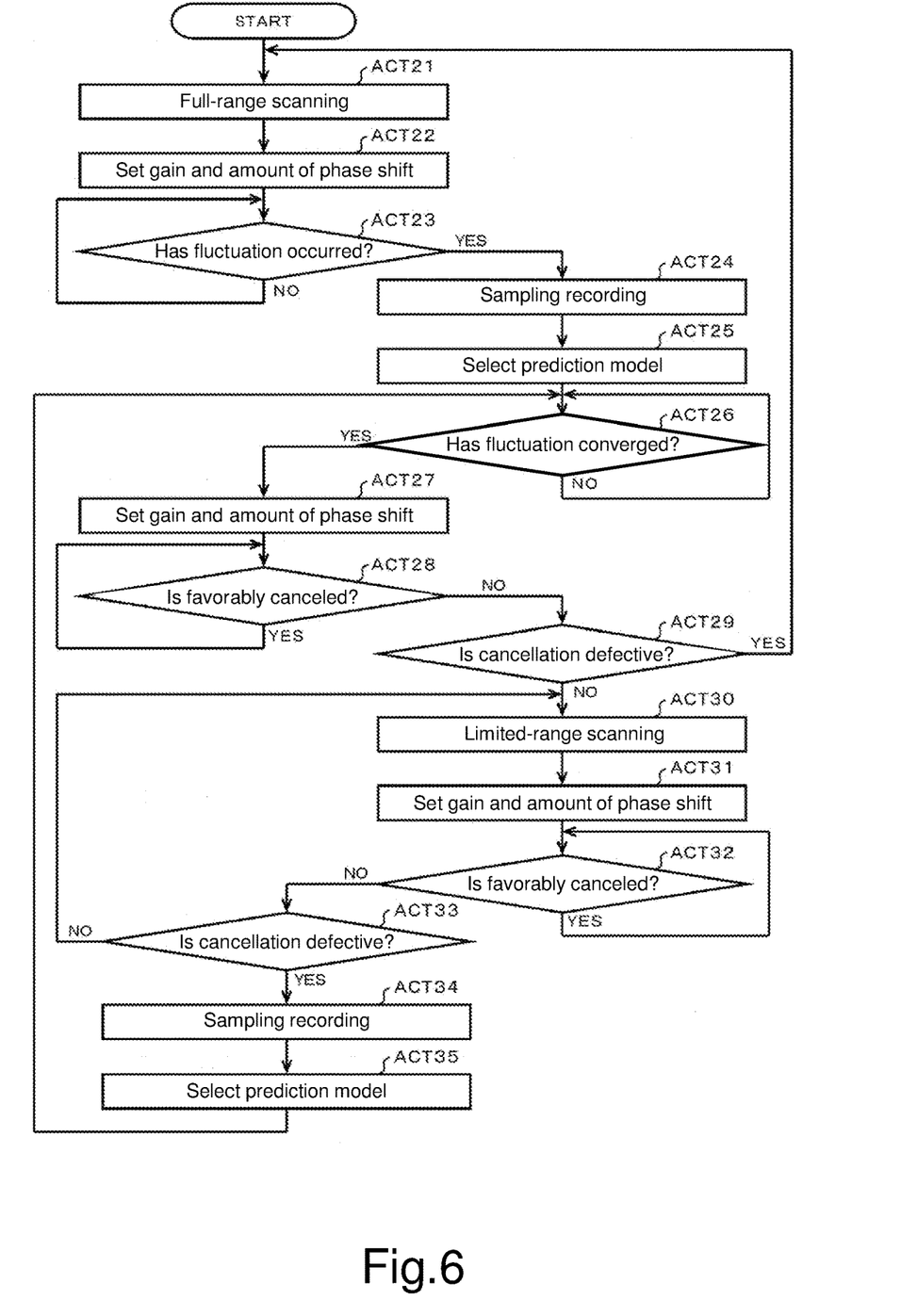
FIG. 6 is a flowchart of control processing of the reading apparatus according to the embodiment.

Incidentally, when the reading apparatus 100 is in a normal operation state, the CPU 311 executes control processing as information processing for controlling the reduction of a self-interference signal as described above in accordance with the information processing program stored in the memory 313. FIG. 6 is a flowchart showing the control processing.

In ACT21, the CPU 311 executes full-range scanning. The specific processing of the CPU 311 in this example may be similar to the processing illustrated for ACT1 in FIG. 2, for example. In ACT22, the CPU 311 sets the gain and the amount of phase shift found in ACT21 in the variable attenuator 21 and the variable phase shifter 22. The specific processing of the CPU 311 in this example may be similar to the processing illustrated for ACT2 in FIG. 2, for example. In this way, the CPU 311 functions as a first control device by executing the control processing based on the information processing program.

In ACT23, the CPU 311 stands by until a self-interference signal fluctuates. The specific processing of the CPU 311 in this example may be similar to the processing illustrated for ACT3 in FIG. 2, for example. Then, in the case where it is determined that a self-interference signal has fluctuated (YES in ACT23), the processing of the CPU 311 proceeds to ACT24. In ACT24, the CPU 311 executes sampling recording of an error level. The specific processing of the CPU 311 in this example may be similar to the processing illustrated for the sampling recording started in ACT4 in FIG. 2, for example. However, the CPU 311 executes sampling recording only for a predetermined period in this example. Assumption is made that the period in which sampling recording is executed is, for example, the period TZA. However, the period in which sampling recording is executed may be arbitrarily determined by a designer of the reading apparatus 100, a creator of the information processing program, or the like such that sampling recording is executed for early part of the period in which the self-interference signal fluctuates.

In ACT25, the CPU 311 selects, on the basis of the fluctuation pattern of error levels recorded in ACT24, one of the plurality of prediction models that is created by the above-mentioned learning processing and stored in the memory 313. The CPU 311 selects, for example, a prediction model representing a fluctuation pattern closest to the fluctuation pattern of error levels recorded in ACT24. However, the rule for the CPU 311 to select a prediction model may be determined by a designer of the reading apparatus 100, a creator of the information processing program, or the like such that a prediction model representing a fluctuation pattern similar to the fluctuation pattern of error levels recorded in ACT24 is selected. In this way, the CPU 311 functions as a selection device by executing thew control processing based on the information processing program.

In ACT26, the CPU 311 determine whether or not the fluctuation of the self-interference signal has converged. The specific processing of the CPU 311 in this example may be similar to the processing illustrated for ACT5 in FIG. 2, for example. Then, in the case where it is determined that the fluctuation of the self-interference signal has converged (YES in ACT26), the processing of the CPU 311 proceeds to ACT27. In ACT27, the CPU 311 sets the gain and the amount of phase shift represented by the prediction model selected in ACT25 in the variable attenuator 21 and the variable phase shifter 22. Such control of the gain and the amount of phase shift based on a prediction model will be referred to as the primary control below. In this way, the CPU 311 functions as a second control device by executing the control processing based on the information processing program.

In ACT28, the CPU 311 determines whether or not the self-interference signal is favorably canceled by the primary control. For example, the CPU 311 determines, in the case where the error level is less than a predetermined third threshold value, that the self-interference signal is favorably cancelled. In the case where it is determined that the self-interference signal is favorably canceled (YES in ACT28), the processing of the CPU 311 returns to ACT28. That is, the CPU 311 maintains the setting in the primary control while the self-interference signal is favorably canceled by the primary control. Therefore, in the case where the gain and the amount of phase shift represented by the prediction model selected in ACT25 match the amplitude and the phase of the self-interference signal after the fluctuation has converged and the self-interference signal is favorably canceled, the operation state is maintained as it is. Note that the third threshold value may be arbitrarily set by a designer of the reading apparatus 100, a creator of the information processing program, or the like.

However, the gain and the amount of phase shift represented by the prediction model selected in ACT25 do not necessarily match the amplitude and the phase of the self-interference signal after the fluctuation has converged and the self-interference signal cannot be sufficiently canceled with the cancel signal generated under the primary control in some cases. Further, the self-interference signal fluctuates while maintaining the operation state in which the self-interference signal can be favorably canceled as described above, and the self-interference signal cannot be sufficiently canceled in some cases. In these cases, the CPU 311 determines, in accordance with the fact that, for example, the error level is the third threshold value or more, that the self-interference signal is not favorably canceled. In the case where it is determined that the self-interference signal is not favorably canceled (NO in ACT28), the processing of the CPU 311 proceeds to ACT29.

In ACT29, the CPU 311 determines whether or not the cancellation of the self-interference signal is defective. For example, the CPU 311 determines, in the case where the error level is a predetermined fourth threshold value or more, that the cancellation of the self-interference signal is defective. In the case where it is determined that the cancellation of the self-interference signal is defective (determined as YES in ACT29), the processing of the CPU 311 returns to ACT21. Note that the fourth threshold value may be arbitrarily determined by a designer of the reading apparatus 100, a creator of the information processing program, or the like. However, the fourth threshold value is larger than the third threshold value. As described above, the CPU 311 repeats, in the case where the cancel signal is deviated to the extent that the error level is the fourth threshold value or more, the processing of ACT21 and subsequent ACTs to re-adjust the gain and the amount of phase shift based on the result of full-range scanning.

The CPU 311 determines, in the case where the error level is not very large and is less than the fourth threshold value, for example, that the cancellation of the self-interference signal is not defective. In the case where it is determined that the cancellation of the self-interference signal is not defective (NO in ACT29), the processing the CPU 311 proceeds to ACT30. In ACT30, the CPU 311 executes limited-range scanning. The limited-range scanning is scanning that targets a limited range that is narrower than the scanning rage in full-range scanning. For example, the CPU 311 checks the error level while gradually changing the gain and the amount of phase shift within the limited range and finds a combination of the gain and the amount of phase shift with which the error level is the smallest. In ACT31, the CPU 311 sets the gain and the amount of phase shift found in ACT30 in the variable attenuator 21 and the variable phase shifter 22. Such control of the gain and the amount of phase shift based on limited-range scanning will be referred to as the secondary control below. As described above, the CPU 311 executes the secondary control in the case where the error level is less than the third threshold value. The range of the error level less than the third threshold value corresponds to a first range.

Figure 7:
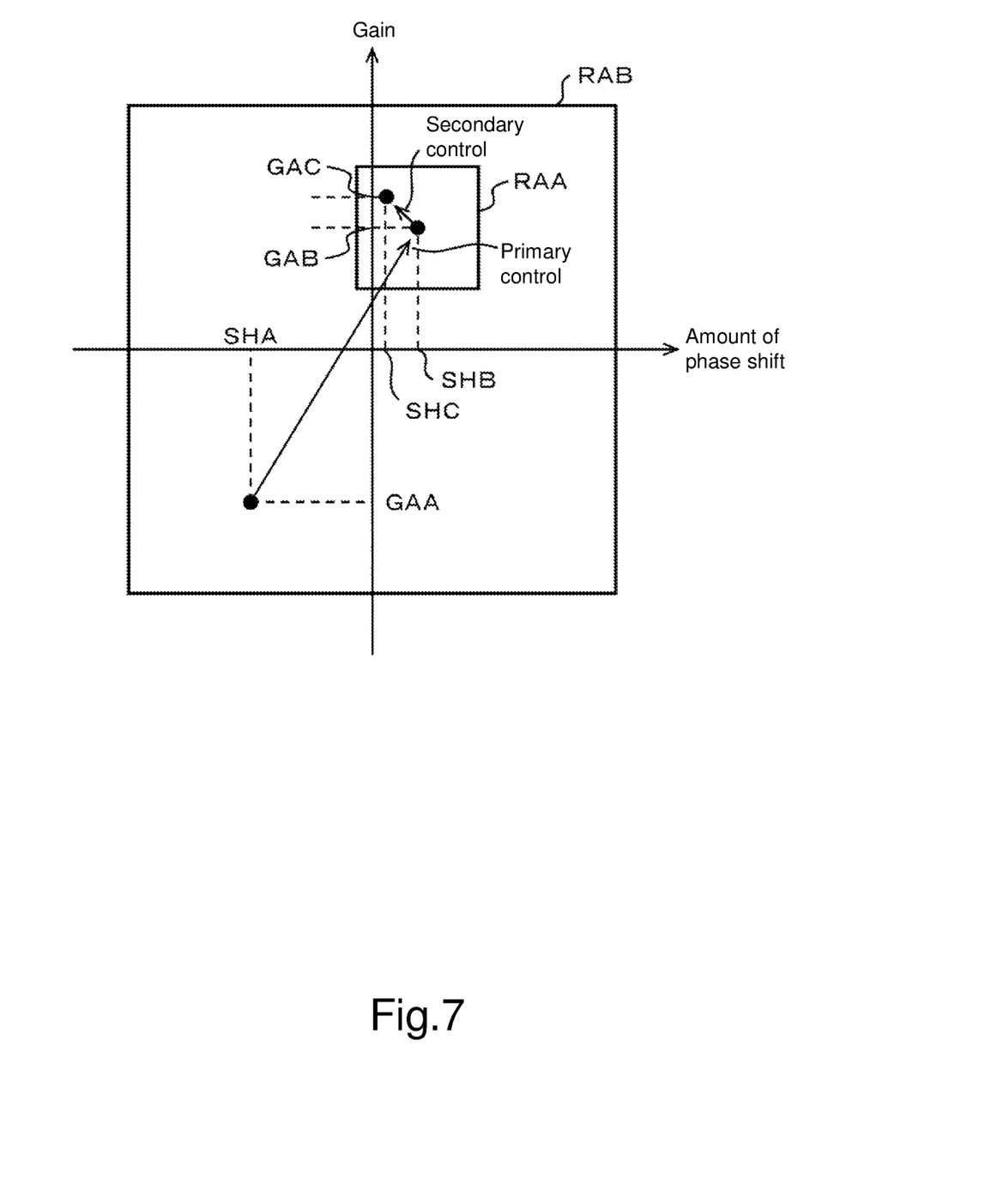
FIG. 7 is a diagram showing an example of a limited range in the reading apparatus according to the embodiment.

FIG. 7 is a diagram showing an example of the primary control and the secondary control. The example shown in FIG. 7 is a case where a gain GAA and an amount of phase shift SHA are set by the CPU 311 in ACT22. Then, the CPU 311 performs the primary control by setting, in ACT27, a gain GAB and an amount of phase shift SHB represented by the prediction model selected on thew basis of the fluctuation pattern of error levels associated with the fluctuation of the self-interference signal. At this time, a limited range RAA is determined in accordance with the gain GAB and the amount of phase shift SHB. The limited range RAA is a partial range in a scanning range RAB of full-range scanning. In this embodiment, the change range of the gain in the limited range RAA is a range from a gain lower than the gain GAB by a first specified value to a gain higher than the gain GAB by the first specified value. Further, in this embodiment, the change range of the amount of phase shift in the limited range RAA is a range from an amount of phase shift lower than the amount of phase shift SHB by a second specified value to an amount of phase shift higher than the amount of phase shift SHA by the second specified value. Further, the CPU 311 performs the secondary control by setting, in ACT31, a gain GAC and an amount of phase shift SHC found by the limited-range scanning regarding the limited range RAA. Note that the change ranges of the gain and the amount of phase shift regarding the limited range RAA may be arbitrarily determined by a designer of the reading apparatus 100, a creator of the information processing program, or the like. Further, the limited range RAA may be determined such that the shape as illustrated in FIG. 7 is another shape such as a rectangle, a circle, and an ellipse.

In ACT32, the CPU 311 determines whether or not the self-interference signal is favorably canceled by the secondary control. The specific processing of the CPU 311 in this example may be similar to the processing illustrated for ACT28, for example. Then, in the case where it is determined that the self-interference signal is favorably canceled (YES in ACT32), the processing of the CPU 311 returns to ACT32. That is, the CPU 311 maintains the setting in ACT31 in the case where the self-interference signal is favorably canceled with the cancel signal generated with the gain and the amount of phase shift found by the limited-range scanning.

However, the self-interference signal cannot be sufficiently canceled with the cancel signal generated by the secondary control in some cases. Further, the self-interference signal fluctuates while maintaining the operation state in which the self-interference signal can be favorably canceled as described above, and the self-interference signal cannot be sufficiently canceled in some cases. In these cases, the CPU 311 determines that the self-interference signal is not favorably canceled. In the case where it is determined that the self-interference signal is not favorably canceled (NO in ACT32), the processing of the CPU 311 proceeds to ACT33.

In ACT33, the CPU 311 determines whether or not the cancellation of the self-interference signal is defective. The specific processing of the CPU 311 in this example may be similar to the processing illustrated for ACT29, for example. Then, in the case where it is determined that the cancellation of the self-interference signal is not defective (NO in ACT33), the processing of the CPU 311 returns to ACT30. That is, the CPU 311 performs the secondary control again in the situation where the cancellation of the self-interference signal is not favorable and not defective.

Note that in the case where the accuracy of the prediction model or the accuracy of selection of the prediction model is low, it is also conceivable that the cancellation of the self-interference signal is not favorable and not defective with the gain and the amount of phase shift within the limited range RAA determined on the basis of the gain and the amount of phase shift represented by the selected prediction model no matter how many times the secondary control is repeated. In this regard, if there is such a possibility, the processing of the CPU 311 may return to ACT21 in the case where it is determined that the cancellation of the self-interference signal is not defective (NO in ACT33) after the secondary control is repeated a predetermined number of times.

In the case where it is determined that the cancellation of the self-interference signal is defective (YES in ACT33), the processing of the CPU 311 proceeds to ACT34. In ACT34, the CPU 311 executes sampling recording of the error level. The specific processing of the CPU 311 in this example may be similar to the processing illustrated for ACT24, for example.

In ACT35, the CPU 311 selects a prediction model on the basis of the fluctuation pattern of the error level recorded in ACT34 described above (see ACT34). The specific processing of the CPU 311 in this example may be similar to the processing illustrated for ACT25, for example. However, for example, in the case where the fourth threshold value is larger than the first threshold value, the time lag from the occurrence of fluctuation of the self-interference signal to the start of sampling recording is larger than that in the sampling recording in ACT24 in some cases. In this regard, the CPU 311 may shorten the period in which sampling recording is executed in ACT34 to be shorter than that in the sampling recording in ACT24. Further, the CPU 311 does not necessarily need to refer to early part of the fluctuation pattern represented by the prediction model when selecting a prediction model in ACT35. That is, the CPU 311 re-selects a prediction model in the situation where the cancellation of the self-interference signal is defective with the cancel signal generated by the secondary control. Then, the processing of the CPU 311 returns to ACT26. Then, the CPU 311 performs the primary control based on the re-selected prediction model again.

As described above, the reading apparatus 100 creates a prediction model taking into consideration of the actual fluctuation of the self-interference signal by learning processing. The reading apparatus 100 selects, in the case where the self-interference signal has largely fluctuated, a prediction model in accordance with the fluctuation pattern at the early stage of the fluctuation. The reading apparatus 100 generates a cancel signal by the primary control applying the gain and the amount of phase shift represented by the prediction model. As a result, the reading apparatus 100 is capable of omitting scanning of the gain and the amount of phase shift and shortening the time necessary for setting for generating a cancel signal.

Further, the reading apparatus 100 performs, in the case where the self-interference signal cannot be favorably canceled with the cancel signal generated by the primary control, the secondary control of scanning the gain and the amount of phase shift to adjust the gain and the amount of phase shift. Therefore, the reading apparatus 100 is capable of achieving the state where the self-interference signal can be favorably canceled. Since, the reading apparatus 100 performs scanning relating to the secondary control only in a limited range, it is possible to shorten the time necessary for the scanning as compared with that in the case of performing full-range scanning.

Further, the reading apparatus 100 re-adjusts, in the case where the self-interference signal cannot be favorably canceled with the cancel signal generated by the secondary control, the gain and the amount of phase shift by the secondary control. Therefore, in the situation where the self-interference signal fluctuates small, the reading apparatus 100 is capable of adjusting the gain and the amount of phase shift so as to compensate for the fluctuation.

This embodiment can be modified in various ways as follows. That is, the embodiment can also be realized as a communication apparatus that communicates with the RFID tag 200 in order to perform wiring to the RFID tag 200. Further, the embodiment can be realized as a communication apparatus for communicating with another communication apparatus different from the RFID tag 200.

Part of all of functions realized by the CPU 311 by information processing can be realized by hardware for executing information processing that is not based on a program, such as a logic circuit. Further, the respective functions described above can also be realized by combining the hardware such as a logic circuit described above with software control.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus, comprising:
a first generation device that generates a transmission signal for wireless transmission;
a duplexer that includes an input terminal for inputting the transmission signal generated by the first generation device, an input/output terminal for outputting the transmission signal input by the input terminal and inputting a reception signal, and an output terminal for outputting the reception signal input by the input/output terminal;
a second generation device that generates a cancel signal by changing an amplitude and a phase of the transmission signal generated by the first generation device;
a synthesis device that synthesizes the reception signal output from the output terminal with the cancel signal;
a detection device that detects an error level of the cancel signal with respect to a self-interference signal included in the reception signal output from the output terminal;
a first control device that controls the second generation device to generate the cancel signal with a gain and an amount of phase shift determined in accordance with the error level detected by the detection device;
a third generation device that records, a plurality of times, a fluctuation pattern of the error level detected by the detection device in a predetermined first period after the error level detected by the detection device starts to fluctuate, and generates, on a basis of a gain and an amount of phase shift determined by the first control device after the plurality of times of fluctuations of the error level converge and the plurality of recorded fluctuation patterns, a plurality of prediction models that associate a fluctuation pattern of the error level predicted in a second period that is early part of the first period and the gain and the amount of phase shift after the converge of fluctuations with each other;
a selection device that selects, on a basis of a fluctuation pattern detected by the detection device in the second period after the error level detected by the detection device starts to fluctuate, one of the plurality of prediction models generated by the third generation device; and
a second control device that controls the second generation device to generate the cancel signal with a gain and an amount of phase shift represented by the prediction model selected by the selection device.

2. The communication apparatus according to claim 1, wherein
the second control device controls the second generation device to generate the cancel signal with a gain and a phase determined on a basis of error levels detected by the detection device while changing a gain and an amount of phase shift within a limited range that is part of a range in which the gain and the amount of phase shift can be adjusted by the second generation device.

3. The communication apparatus according to claim 2, wherein
the second control device controls, where the error level detected by the detection device of the cancel signal generated by the second generation device with the gain and the amount of phase shift represented by the prediction model selected by the selection device is out of a first range, the second generation device to generate the cancel signal with the gain and the phase determined on a basis of the error levels detected by the detection device while changing the gain and the amount of phase shift in the limited range.

4. The communication apparatus according to claim 3, wherein
the second control device controls, where the error level detected by the detection device of the cancel signal generated by the second generation device is out of the first range, the second generation device to generate the cancel signal with the gain and the phase determined on a basis of the error levels detected by the detection device while changing the gain and the amount of phase shift in the limited range.

5. The communication apparatus according to claim 1, further comprising
a detection device that orthogonally detects a combined output of the synthesis device by a carrier wave and outputs two-system reception baseband signals, wherein
the detection device detects an error level on a basis of signal levels of the two-system reception baseband signals output from the detection device.

6. A communication apparatus, comprising:
a transmission signal generator that generates a transmission signal for wireless transmission;
a duplexer that includes an input terminal for inputting the transmission signal generated by the transmission signal generator, an input/output terminal for outputting the transmission signal input by the input terminal and inputting a reception signal, and an output terminal for outputting the reception signal input by the input/output terminal;
a cancel signal generator that generates a cancel signal by changing an amplitude and a phase of the transmission signal generated by the transmission signal generator;
a synthesis device that synthesizes the reception signal output from the output terminal with the cancel signal;
a detection device that detects an error level of the cancel signal with respect to a self-interference signal included in the reception signal output from the output terminal; and
a processor configured to
perform first control for controlling the cancel signal generator to generate the cancel signal with a gain and an amount of phase shift determined in accordance with the error level detected by the detection device,
perform generation processing for recording, a plurality of times, a fluctuation pattern of the error level detected by the detection device in a predetermined first period after the error level detected by the detection device starts to fluctuate, and generating, on a basis of a gain and an amount of phase shift determined by the first control after the plurality of times of fluctuations of the error level converge and the plurality of recorded fluctuation patterns, a plurality of prediction models that associate a fluctuation pattern of the error level predicted in a second period that is early part of the first period and the gain and the amount of phase shift after the converge of fluctuations with each other,
perform selection processing for selecting, on a basis of a fluctuation pattern detected by the detection device in the second period after the error level detected by the detection device starts to fluctuate, one of the plurality of prediction models generated by the generation processing, and
perform second control for controlling the cancel signal generator to generate the cancel signal with a gain and an amount of phase shift represented by the prediction model selected by the selection processing.

7. The communication apparatus according to claim 6, wherein
the second control includes controlling the cancel signal generator to generate the cancel signal with a gain and a phase determined on a basis of error levels detected by the detection device while changing a gain and an amount of phase shift within a limited range that is part of a range in which the gain and the amount of phase shift can be adjusted by the cancel signal generator.

8. The communication apparatus according to claim 7, wherein
the second control includes controlling, where the error level detected by the detection device of the cancel signal generated by the cancel signal generator with the gain and the amount of phase shift represented by the prediction model selected by the selection processing is out of a first range, the cancel signal generator to generate the cancel signal with the gain and the phase determined on a basis of the error levels detected by the detection device while changing the gain and the amount of phase shift in the limited range.

9. The communication apparatus according to claim 8, wherein
the second control includes controlling, where the error level detected by the detection device of the cancel signal generated by the cancel signal generator is out of the first range, the cancel signal generator to generate the cancel signal with the gain and the phase determined on a basis of the error levels detected by the detection device while changing the gain and the amount of phase shift in the limited range.

10. The communication apparatus according to claim 6, further comprising
a detection device that orthogonally detects a combined output of the synthesis device by a carrier wave and outputs two-system reception baseband signals, wherein
the detection device detects an error level on a basis of signal levels of the two-system reception baseband signals output from the detection device.

* * * * *